T. Scanlan.
Glass House Pot.
N° 93,839. Patented Aug. 17, 1869.
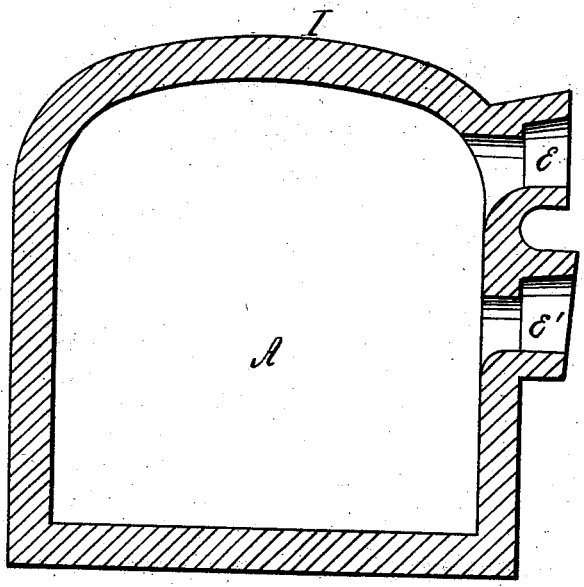
Witnesses:
C. A. Pettit
S. C. Kenyon
Inventor:
Thomas Scanlan
by Munn & Co.
Attorneys.

United States Patent Office.

THOMAS SCANLAN, OF BIRMINGHAM, PENNSYLVANIA.

Letters Patent No. 93,839, dated August 17, 1869.

---

IMPROVEMENT IN GLASS-HOUSE POTS.

---

The Schedule referred to in these Letters Patent and making part of the same.

---

*To all whom it may concern:*

Be it known that I, THOMAS SCANLAN, of Birmingham, in the county of Huntingdon, and State of Pennsylvania, have invented a new and improved Glass-House Pot; and I do hereby declare that the following is a full, clear, and exact description of the construction and operation of the same, reference being had to the accompanying drawings, making a part of this specification, in which my invention is represented by a longitudinal vertical section.

The object of this invention is to provide, for the use of glass-manufacturers, a pot or crucible in which to prepare the glass, so constructed and operating that it will produce more glass to a "filling" than those heretofore employed, and do its work in less time and with greater convenience.

In the drawings—

A represents the body of the pot or crucible; it being of such a form that its longitudinal section is elliptical, while its vertical section shows the side walls straight and vertical, the bottom flat and horizontal, and the top a low, flat dome, or arch, I.

Near the upper edge of one side wall, (or, more properly, end wall,) it is provided with two mouths, e e', with projecting lips, one mouth being arranged vertically over the other, for convenience in filling the pot in the furnace.

The upper mouth e comes exactly at the upper edge of the vertical wall, and the lower mouth, e', is immediately under it, separated only by a very narrow ledge, the lower mouth itself being, in the glass-pots of ordinary size, twenty-four inches from the bottom of the pot, and being entirely above the middle of the side wall.

I am aware that a pot has heretofore been made, having two mouths, one at the upper edge and one at the lower edge of the side wall. Such construction differs materially from mine, both in appearance and in the practical working of the pot, and I lay no claim to such construction, nor to any two-mouth pot in which the lower mouth is below the middle of the side wall.

The material of which the pot is constructed is fire-clay or other suitable refractory material.

This improved pot or crucible has been thoroughly tested in the glass-works at Pittsburg, Pennsylvania, and it has been demonstrated that it will produce twice as much glass to the filling as the old pots, and in half the time, besides being more convenient for use, and saving labor as well as time.

Having thus described my invention,

What I claim as new, and desire to secure by Letters Patent, is—

In a pot or crucible for making glass, having the body A made of fire-clay and provided with a concave roof, I, and mouth e, of usual form and construction, the additional mouth e', formed immediately under the mouth e, and above the middle line of the side wall, substantially as described.

his
THOMAS × SCANLAN.
mark.

Witnesses:
JOS. A. WICKLINE,
THOMAS MULHALL.